United States Patent [19]

Puckett et al.

[11] Patent Number: 5,395,899
[45] Date of Patent: Mar. 7, 1995

[54] CROSSLINKED POLYMER THAT INHIBITS SMEARING

[75] Inventors: Richard D. Puckett; Paul W. Seitz, both of Miamisburg, Ohio

[73] Assignee: NCR Corporation, Dayton, Ohio

[21] Appl. No.: 93,300

[22] Filed: Jul. 16, 1993

Related U.S. Application Data

[63] Continuation of Ser. No. 690,458, Apr. 24, 1991, abandoned.

[51] Int. Cl.⁶ ............................................. C08F 283/02
[52] U.S. Cl. ...................................... 525/464; 525/102; 525/479; 525/404; 525/465; 428/195; 428/511; 428/914
[58] Field of Search ............... 525/102, 464, 465, 479, 525/404; 428/914, 195, 511

[56] References Cited

U.S. PATENT DOCUMENTS

| | | | |
|---|---|---|---|
| 3,944,695 | 3/1976 | Kosaka et al. | 524/517 |
| 4,424,245 | 1/1984 | Maruta et al. | 428/40 |
| 4,459,382 | 7/1984 | Ona et al. | 524/860 |
| 4,600,628 | 7/1986 | Ishii et al. | 428/216 |
| 4,643,917 | 2/1987 | Koshizuka et al. | 427/256 |
| 4,707,406 | 11/1987 | Inaba et al. | 428/336 |
| 4,740,495 | 4/1988 | Marinelli et al. | 503/214 |
| 4,828,638 | 5/1989 | Brown | 156/234 |
| 4,840,848 | 6/1989 | Koshizuka et al. | 428/413 |
| 4,961,997 | 10/1990 | Asano et al. | 428/423.1 |
| 5,084,330 | 1/1992 | Koshizuka et al. | 428/913 |
| 5,095,002 | 3/1992 | Beck et al. | 428/913 |
| 5,202,162 | 4/1993 | Hart, Jr. et al. | 525/227 |

*Primary Examiner*—Melvyn I. Marquis
*Assistant Examiner*—Randy Gulakowski
*Attorney, Agent, or Firm*—Craig E. Miller

[57] ABSTRACT

A smear resistant thermally reactive material for use in a one-coat system, the thermally reactive material being applied to a receiver stock and consisting essentially of: about 55–75% wax; a binder of about 0.5–11% ethylene vinyl acetate; a pigment of about 6–26% color pigment; a dye of about 0.5–14% color forming dye; and a reactant of about 5–15% epoxy resin. The smear resistant thermally reactive material has a cohesive strength that inhibits smearing of data that is thermally transferred from an ink ribbon to the receiver stock. A crosslinking polymer for use in a two-coat system is also disclosed. The crosslinking polymer has a first coating consisting of a catalyst of 100% organosilane and a second coating consisting essentially of: about 55–75% wax; a binder of about 0.5–11% ethylene vinyl acetate; a pigment of about 6–26% color pigment; a dye of about 0.5–14% color forming dye; and a reactant of about 5–15% organosiloxane. The second coating crosslinks and is thermally reactive with the first coating in order to provide a resultant coating having a cohesive strength that inhibits smearing of the resultant coating when an ink ribbon contacts or thermally reacts with the receiver stock.

15 Claims, 1 Drawing Sheet

CROSSLINKED POLYMER THAT INHIBITS SMEARING

This is a continuation of application Ser. No. 07/690,458, filed on Apr. 24, 1991, now abandoned.

BACKGROUND OF THE INVENTION

1. Field of the Invention

This invention relates to a smear resistant thermally reactive material, and more specifically, it relates to a crosslinking polymer having a first coating and a second coating which is thermally reactive with the first coating in order to provide a resultant coating having a cohesive strength that inhibits smearing of the resultant coating.

2. Description of Related Art

In the field of product labeling, it has been common practice to apply product information, such as content, weight, price and the like, to a product label by means of a printing apparatus utilizing ink or ink ribbons. It is further common practice to print machine readable indicia, such as a bar code, on the product label by means of a conventional ink printing apparatus, such as a thermal printer. The product labels are then attached to the product or to the product packaging.

During the course of a normal business day, a customer may handle the product label in order to inspect the price, for example. It is not uncommon that the bar code or other product information printed on the product label becomes smeared or scratched as a result of such handling. The bar code on the product label may also become scratched or smeared when an operator at a point of sale ("POS") terminal scans the bar code. This typically occurs when the operator uses a wand scanner to scan the bar code, or the operator tries to scan the product label by dragging the product across an optical scanner located in a checkout counter of the POS terminal. Once the bar code or other product information is scratched or smeared, it becomes difficult or sometimes impossible to scan. The operator is then forced to either manually look up the price of the product in a price manual or check the price of the product by going to the location in the store where the product is displayed and verifying the price. This leads to undesirable results, such as downtime in the POS terminal and customer dissatisfaction. These results can be expensive and can cause the store to become non-competitive.

SUMMARY OF THE INVENTION

It is, therefore, an object of the present invention to provide a thermally reactive crosslinking polymer having a first coating and a thermally activated second coating which crosslinks with the first coating in order to provide a resultant coating having a cohesive strength that inhibits smearing of the resultant coating.

Another object of the present invention is to provide a smear resistant thermally reactive material which has a cohesive strength that inhibits smearing of data that is thermally transferred from an ink ribbon to a receiver stock.

Another object of the present invention is to provide a crosslinking polymer having a first coating and a second coating which are inexpensive to manufacture and which can be easily adhered to either an ink ribbon or a receiving stock.

With these and other objects, which will become apparent from the following description, the invention includes certain novel features of construction and combinations of parts, a preferred form or embodiment of which is hereinafter described with reference to the drawing which accompanies and forms a part of this specification.

DETAILED DESCRIPTION OF THE INVENTION

Figure 1:
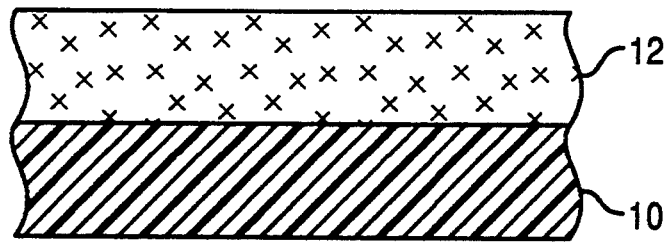
FIG. 1 is a sectional view of a receiver stock, on which a first coating is adhered according to one embodiment of the present invention.
Figure 2:
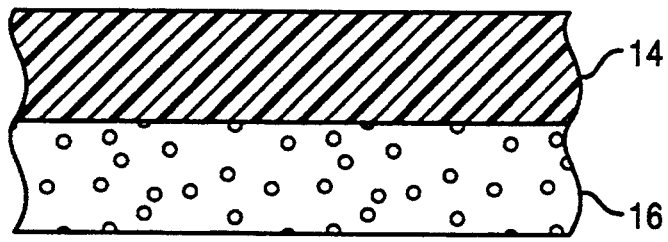
FIG. 2 is a sectional view of an ink ribbon on which a second coating is adhered according to one embodiment of the present invention.

FIG. 1 is a sectional view of a base sheet of paper or receiver stock 10. In a preferred embodiment, the receiver stock 10 is eight-point receiver stock which provides for intense and well-defined black images. The receiver stock 10 may be a price tag label or any other suitable stock which can support a thermally reactive first coating 12. FIG. 2 shows a sectional view of an ink ribbon 14 which can support a thermally reactive second coating 16.

Figure 3:
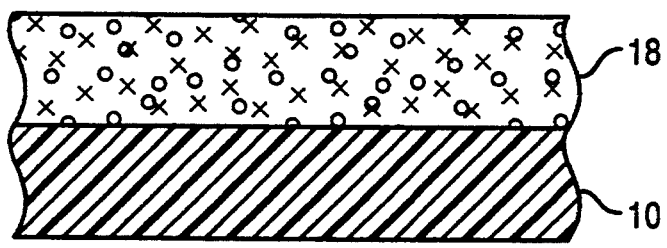
FIG. 3 is a sectional view of the receiver stock, showing the resultant coating which results from the second coating crosslinking and being thermally reactive with the first coating.

As best shown in FIG. 3, the second coating 16 is thermally reactive and will crosslink with the first coating 12 in order to provide a resultant coating 18 on the receiver stock 10. As a result of the bonding of the first and second coatings 12 and 16, the resultant coating 18 has a cohesive strength that inhibits smearing.

Figure 4:
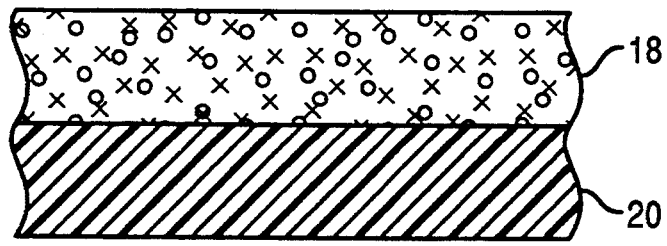
FIG. 4 is a sectional view of the receiver stock, showing a one-coat crosslinking polymer system.

FIG. 4 shows an embodiment of the present invention wherein the crosslinking polymer is a one-coat polymer embodied on a substrate 20. The crosslinking polymer of this embodiment does not react until it is heated by a thermal printhead (not shown).

The following examples show coating systems including means for providing a thermally reactive material having a cohesive strength that inhibits smearing of data.

EXAMPLE I

Example I is a composition, arranged as in FIG. 4, which provides a one coat system. The one coat system provides a crosslinking polymer which could be used in any thermosensitive or thermally reactive material.

| Material | % Dry | Wet Wt. | Range |
| --- | --- | --- | --- |
| Mineral Spirits | 0 | 245 | — |
| Wax: | | | |
| WB-17 | 20 | 35 | 10–30 |
| Paraffin 1014 | 35 | 55 | 25–45 |
| Carnauba #3 | 10 | 15 | 5–15 |
| Binder: | | | |
| Elvax 40W | 5 | 10 | 1–10 |
| Pigment: | | | |
| Permablak LS-60 | 15 | 50 | 10–20 |
| Dye: | | | |
| Neptune X-14 Oleate | 5 | 5 | 1–10 |

| Material | % Dry | Wet Wt. | Range |
|---|---|---|---|
| Catalyst/reactant: | | | |
| Dow DER 684EK40 | 10 | 15 | 1–20 |
| | 100 | 430 | |

In this example, a reactant and a catalyst are provided in an epoxy resin. The epoxy resin comprises polymers of epoxy resin and Bisphenol A. A suitable epoxy resin for this embodiment is the Dow DER 684EK40, manufactured by Dow Corning Co., of Midland, Mich. The binder used in this one-coat system is ethylene vinyl acetate, and the dye is a color forming dye selected from the group consisting of oleate, nigrosine or phenazine. The mineral spirits, wax, binder, pigment, dye and reactant/catalyst are mixed together and coated onto the substrate 20 (FIG. 4) with a coating of 2.6 g/m²±0.5 g/m². The reactant/catalyst, Dow DER 684EK40, is a thermally reactive ingredient which inhibits scratching, smearing and abrasions. This feature facilitates protecting data, such as a UPC or bar code (not shown), from unwanted smearing.

EXAMPLE II

Example II shows a composition, arranged as in FIGS. 1, 2 and 3, showing a two-coat system. The two-coat system includes a crosslinking polymer having the first coating 12 mixed with the second coating 16. The second coating 16 (FIG. 2) is thermally reactive and crosslinks with the first coating 12 (FIG. 1) in order to provide a resultant coating 18 (FIG. 3) on the receiver stock 10 having a cohesive strength that inhibits smearing and scratching of the resultant coating 18.

| Material | % Dry | Wet Wt. | Range |
|---|---|---|---|
| First coating: | | | |
| Catalyst | | | |
| Organosilane | 100 | 30 | |
| | 100 | 30 | |
| Second coating: | | | |
| Mineral Spirits | 0 | 410 | — |
| Wax: | | | |
| Unilin 350 | 20 | 30 | 10–30 |
| Polywax 500 | 20 | 30 | 10–30 |
| Carnauba #3 | 20 | 30 | 10–30 |
| Binder: | | | |
| Elvax 40W | 5 | 10 | 5–15 |
| Pigment: | | | |
| Permablak LS-60A | 20 | 70 | 10–30 |
| Dye: | | | |
| Basonyl Black X-22 | 5 | 5 | 1–10 |
| Reactant: | | | |
| Organosiloxane | 10 | 15 | 5–15 |
| | 100 | 600 | |

In this example, the first coating 12 is an organosilane catalyst known as n-beta-aminoethylgamma-aminopropyl ethylenediamine. A suitable organosilane has been found to be the Dow Corning Z-6020, manufactured by Dow Corning Corp. The second coating 16 (FIG. 2) includes a wax, binder, pigment, dye and reactant. The reactant is an organosiloxane known as glycidoxypropyltrimethoxysilane. A suitable organosiloxane has been found to be the Dow Corning Z-6040, manufactured by Dow Corning Corp. In this example, the wax may be selected from the group consisting of an amide, polyamide, paraffinic, polyester, polymeric alcohols, microcrystalline, polyurethane, modified hydrocarbon, or carnauba. The pigment is Permablak LS-60, and the binder is ethylene vinyl acetate. The dye may be a color forming dye selected from the group consisting of oleate, nigrosine or phenazine.

The first coating 12 is applied as a wash coat on the receiver stock 10, as illustrated in FIG. 1. The mineral spirits, wax, binder, pigment, dye and reactant of the second coating 16 are mixed together and coated onto a polyester receiver stock (not shown) with a coating of 3.9 g/m²±0.5 g/m². When the thermal printhead (not shown) causes the ink ribbon 14 to thermally engage the receiver stock 10, the first and second coatings 12 and 16 react to provide the resultant coating 18 shown in FIG. 3. The resultant coating 18 will have a cohesive strength that inhibits smearing and scratching. Although not shown, the catalyst and the reactant could be adhered to the ink ribbon 14 and the receiver stock 10, respectively, rather than the receiver stock 10 and the ink ribbon 14.

EXAMPLE III

Example III shows another two-coat system, which can also be arranged as in FIGS. 1, 2 and 3.

| Material | % Dry | Wet Wt. | Range |
|---|---|---|---|
| First coating: | | | |
| Water | — | 270 | — |
| Catalyst: | | | |
| Bisphenol A | 75 | 150 | 65–75 |
| Binder: | | | |
| EC-1052 | 25 | 80 | 15–35 |
| | 100 | 500 | |
| Second coating: | | | |
| Mineral Spirits | 0 | 410 | — |
| Wax: | | | |
| Unilin 350 | 20 | 30 | 10–30 |
| Polywax 500 | 20 | 30 | 10–30 |
| Carnauba #3 | 20 | 30 | 10–30 |
| Binder: | | | |
| Elvax 40W | 5 | 10 | 5–15 |
| Pigment: | | | |
| Permablak LS-60A | 20 | 70 | 10–30 |
| Dye: | | | |
| Basonyl Black X-22 | 5 | 5 | 1–10 |
| Reactant: | | | |
| Organosiloxane | 10 | 15 | 5–15 |
| | 100 | 600 | |

In this example, the first coating 12 (FIG. 1) consists essentially of a phenolic component, such as Bisphenol A, and a binder. In contrast to the first coating 12 shown in example II, the first coating 12 of example III includes a latex binder, such as EC-1052 manufactured by Environmental Ink Co. of Morgantown, N.C. The first coating 12 is adhered to the receiver stock 10, as shown in FIG. 1. The second coating 16 includes a wax, binder, pigment, dye and a reactant. As in Example II above, the reactant is an organosiloxane known as glycidoxypropyltrimethoxysilane. The organosiloxane is the Dow Corning Z-6040. In this example III, the wax may be selected from the group consisting of an amide, polyamide, paraffinic, polyester, polymeric alcohols, microcrystalline, polyurethane, modified hydrocarbon, or carnauba. The binder for the second coating 16 consists essentially of ethylene vinyl acetate or Elvax 40W. In a preferred embodiment, the pigment is Permablak LS-60. The dye may be a color forming dye selected from the group consisting of oleate, nigrosine or phenazine.

The first coating 12 is mixed and applied as a wash coat on the receiver stock 10 as illustrated in FIG. 1. In this Example III, the receiver stock 10 is a tag having a high gloss finish coating on one side. The mineral spirits, wax, binder, pigment, dye and reactant of the second coating 16 are mixed together and coated onto a polyester receiver stock 10 with a coating of 3.9 g/m²±0.5 g/m².

Like the second coating 16 in Example II above, when a thermal printhead (not shown) causes ink ribbon 14 to thermally engage the receiver stock 10, the second coating 16 thermally reacts and crosslinks with the first coating 12 (FIG. 1) in order to provide a resultant coating 18 (FIG. 3) having a cohesive strength that inhibits smearing and scratching. As with the first and second coatings 12 and 16, described above in relation to Example II, the reactant and catalyst could be adhered to the ink ribbon 14 and receiver stock 10, respectively, rather than the receiver stock 10 and ink ribbon 14.

EXAMPLE IV

This example is similar to example III in utilizing the first and second coatings 12 and 16, except that the receiver stock 10 for this example IV was a tag having a thickness 8 points or 0.008 inch and also having a high gloss finish coating on one side.

The various ingredients utilized in the above examples are hereafter further identified and are available from the noted sources. The polywax 500 is a low molecular weight polyethylene wax available from Petrolite of Tulsa, Okla. The Carnauba #3 is a hard, amorphous wax which is soluble in ether, boiling alcohol and alkalies and is available from Baldini & Co. of Millburn, N.J. The Unilin 350 is a primary linear alcohol which is available from Petrolite. The WB-17 is a modified hydrocarbon wax which is also available from Petrolite. The paraffin 1014 is a mixture of solid hydrocarbons chiefly of the methane series derived from the paraffin distillate portion of crude petroleum and is soluble in benzene, ligroine, alcohol, chloroform, turpentine, carbon disulfide and olive oil and is available from Boler of Wayne, Pa. The catalyst, bisphenol A, is Lupasol FF3231 which is available from BASF Corporation of Germany. The binder, Elvax 40W, is an ethylene vinyl acetate copolymer which is available from E. I. dupont of Wilmington, Del. The binder, EC-1052, is a latex which is available from Environmental Ink Co. of Morganton, N.C. The pigments, Permablak LS-60 and Permablak LS-60A, are black amorphous powders of relatively coarse particles insoluble in solvents which are available from Mono-Chem of Atlanta, Tex. The Basonyl Black X-22 dye is an azine dye in n-propanol used as an intensifier which is available from Dow Chemical of Midland, Mich. The Oleate dye is a filler and also a coloring agent which is available from BASF Corporation. As mentioned previously herein, the Dow DER 684EK40, Dow Corning Z-6020, and Dow Corning Z-6040 are epoxies available from Dow Corning Corporation of Midland, Mich. The mineral spirits are available from Ashland Chemical Co. out of Columbus, Ohio.

A testing operation was set up to test the surface resistance of the resultant coating 18 against smearing. The receiving stock 10 and ink ribbon 14 were treated at room temperature with the ingredients and quantities described in examples I, II, III and IV above. A UPC or bar code (not shown) was printed on 8 point receiving stock 10 using the ink ribbon 14. The smear resistance of a plurality of test samples (not shown) of the receiver stock 10 were determined by moving the test samples back and forth under a soft rubber foot (not shown) for 10 cycles. The test samples were moved under the soft rubber foot in a direction perpendicular to the bar codes. The soft rubber foot applied 4.3 pounds of pressure or 69 pounds per square inch to each test sample.

The reflectivity of the background area surrounding the bar code was measured before and after each test sample was cycled under the soft rubber foot. The background reflectivity was measured using a MacBeth RD 400 Reflectometer which was calibrated at 0.06 white and 1.76 black. An average reflectivity was calculated for the test samples in each example.

The plurality of test samples for each of the examples I, II, III and IV were prepared, and a control sample was also prepared including the resultant coating 18 without the thermally reactive materials described in examples I, II III and IV. Table 1 below is a compilation of the test results. It was found that the composition of example III provided the most resistance to smearing. The reflectivity of the background area of the test sample for example III increased from 0.13 before smearing to 0.06 after smearing. This data indicates that the bar code did not smear, and in fact, the soft rubber foot actually "glossed-up" the area outside the bar code and improved the reflectivity of this area. In the composition of example I, the reflectivity of the background area decreased from 0.05 before smearing to 0.06 after smearing. This data indicates that the bar code in example I was less resistant to smearing because some of the bar code smeared into the background area. However, even this amount of smearing was not significant when compared to the amount that the control sample smeared.

TABLE 1

| SMEAR RESISTANCE | | |
|---|---|---|
| | REFLECTIVITY | |
| | BEFORE SMEAR | AFTER SMEAR |
| EXAMPLE I | .05 | .06 |
| EXAMPLE II | .07 | .07–.03 |
| EXAMPLE III | .13 | .06 |
| EXAMPLE IV | .09 | .14–.06 |
| CONTROL SAMPLE | .04–.06 | .09–.33 |

Various changes or modifications in the invention described may occur to those skilled in the art without departing from the spirit or scope of the invention. The above description of the invention is intended to be illustrative and not limiting, and it is not intended that the invention be restricted thereto but that it be limited only by the true spirit and scope of the appended claims.

What is claimed is:

1. A system of two coated articles which, when placed in contact with each other, form a resultant crosslinked polymer, said system comprising:
   a receiver stock having a first surface;
   a first coating adhered to said first surface of said receiver stock, said first coating consisting essentially of:
   a catalyst of 100% diamine;
   a transfer medium having a substrate with a first surface;

a second coating adhered to said first surface of said substrate, said second coating consisting essentially of:
about 55–75% wax;
a binder of about 0.5–11% ethylene vinyl acetate;
a pigment of about 6–26% color pigment;
a dye of about 0.5–14% color forming dye; and
a reactant of about 5–15% glycidoxypropyltrimethoxysilane;
said second coating being thermally reactive with said first coating to provide a resultant crosslinked polymer on said first surface of said receiver stock, said resultant crosslinked polymer having a cohesive strength which inhibits smearing.

2. The system of two coated articles which, when placed in contact with each other, form a resultant crosslinked polymer in accordance with claim 1, wherein said catalyst is n-beta-aminoethylgamma-aminopropyl ethylenediamine.

3. The system of two coated articles which, when placed in contact with each other, form a resultant crosslinked polymer in accordance with claim 1, wherein said second coating consists essentially of:
about 65% wax, said wax being a combination of a polyamide and a carnauba;
about 5% ethylene vinyl acetate;
about 10% color pigment;
about 6.5% color forming dye selected from the group consisting of oleate, nigrosine and phenazine; and
the remainder glycidoxypropyltrimethoxysilane.

4. The system of two coated articles which, when placed in contact with each other, form a resultant crosslinked polymer in accordance with claim 2, wherein said second coating consists essentially of:
about 65% wax, said wax being a combination of a polyamide and a carnauba;
about 5% ethylene vinyl acetate;
about 10% color pigment;
about 6.5% color forming dye selected from the group consisting of oleate, nigrosine and phenazine; and
the remainder glycidoxypropyltrimethoxysilane.

5. The system of two coated articles which, when placed in contact with each other, form a resultant crosslinked polymer in accordance with claim 1, wherein said second coating consists essentially of:
about 60% wax, said wax being a combination of a polyamide and a carnauba;
about 5% ethylene vinyl acetate;
about 20% color pigment;
about 5% color forming dye selected from the group consisting of oleate, nigrosine and phenazine; and
about 10% glycidoxypropyltrimethoxysilane.

6. The system of two coated articles which, when placed in contact with each other, form a resultant crosslinked polymer in accordance with claim 2, wherein said second coating consists essentially of:
about 60% wax, said wax being a combination of a polyamide and a carnauba;
about 5% ethylene vinyl acetate;
about 20% color pigment;
about 5% color forming dye selected from the group consisting of oleate, nigrosine and phenazine; and
about 10% glycidoxypropyltrimethoxysilane.

7. The system of two coated articles which, when placed in contact with each other, form a resultant crosslinked polymer in accordance with claim 1, wherein said transfer medium is an ink ribbon.

8. The system of two coated articles which, when placed in contact with each other, form a resultant crosslinked polymer in accordance with claim 6, wherein said transfer medium is an ink ribbon.

9. The system of two coated articles which, when placed in contact with each other, form a resultant crosslinked polymer in accordance with claim 1, wherein said resultant crosslinked polymer is produced in response to heating from a thermal printhead.

10. The system of two coated articles which, when placed in contact with each other, form a resultant crosslinked polymer in accordance with claim 6, wherein said resultant crosslinked polymer is produced in response to heating from a thermal printhead.

11. The system of two coated articles which, when placed in contact with each other, form a resultant crosslinked polymer in accordance with claim 1, wherein said receiver stock is a price tag label.

12. The system of two coated articles which, when placed in contact with each other, form a resultant crosslinked polymer in accordance with claim 2, wherein said receiver stock is a price tag label.

13. The system of two coated articles which, when placed in contact with each other, form a resultant crosslinked polymer in accordance with claim 8, wherein said receiver stock is a price tag label.

14. The system of two coated articles which, when placed in contact with each other, form a resultant crosslinked polymer in accordance with claim 10, wherein said receiver stock is a price tag label.

15. A method of forming a resultant crosslinked polymer, comprising the steps of:
providing a receiver stock having a first surface;
adhering a first coating to said first surface of said receiver stock, said first coating consisting essentially of a catalyst of 100% diamine;
providing a transfer medium having a substrate with a first surface;
adhering a second coating to said first surface of said substrate, said second coating consisting essentially of about 55–75% wax, a binder of about 0.5–11% ethylene vinyl acetate, a pigment of about 6–26% color pigment, a dye of about 0.5–14% color forming dye and a reactant of about 5–15% glycidoxypropyltrimethoxysilane; and
thermally reacting said second coating with said first coating to provide said resultant crosslinked polymer on said first surface of said receiver stock, said resultant crosslinked polymer having a cohesive strength which inhibits smearing.

* * * * *